US011974128B2

(12) United States Patent
Eitoku et al.

(10) Patent No.: US 11,974,128 B2
(45) Date of Patent: Apr. 30, 2024

(54) COMMUNICATION METHOD, COMMUNICATION SYSTEM, RELAY DEVICE, AND RELAY PROGRAM

(71) Applicant: Nippon Telegraph and Telephone Corporation, Tokyo (JP)

(72) Inventors: Haruka Eitoku, Tokyo (JP); Koji Tanida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 351 days.

(21) Appl. No.: 17/433,680

(22) PCT Filed: Feb. 12, 2020

(86) PCT No.: PCT/JP2020/005214
§ 371 (c)(1),
(2) Date: Aug. 25, 2021

(87) PCT Pub. No.: WO2020/175129
PCT Pub. Date: Sep. 3, 2020

(65) Prior Publication Data
US 2022/0053328 A1 Feb. 17, 2022

(30) Foreign Application Priority Data

Feb. 26, 2019 (JP) ................. 2019-032841

(51) Int. Cl.
*H04W 12/08* (2021.01)
*H04W 8/20* (2009.01)
*H04W 12/06* (2021.01)

(52) U.S. Cl.
CPC ............. *H04W 12/06* (2013.01); *H04W 8/20* (2013.01)

(58) Field of Classification Search
CPC ....... H04W 12/72; H04W 12/06; H04W 8/20; H04W 88/14; H04W 8/04; H04W 12/70; H04W 12/08; G06F 21/44
See application file for complete search history.

(56) References Cited

U.S. PATENT DOCUMENTS 9,648,019 B2 * 5/2017 Khello ................. H04W 12/06
10,582,382 B2 * 3/2020 Chen ...................... H04W 8/04
(Continued)

FOREIGN PATENT DOCUMENTS

JP 5931802 6/2016

*Primary Examiner* — Khawar Iqbal
(74) *Attorney, Agent, or Firm* — Fish & Richardson P.C.

(57) ABSTRACT

A terminal not equipped with a SIM is authenticated properly by a mobile core network. A communication system 7 includes a relay device 1 included in a fixed core network 6 and an HSS 56 included in a mobile core network 5. The relay device 1 includes an issuing unit 21 that issues IMSI information corresponding to a subscriber identifier of a non-SIM terminal 3 and authentication information corresponding to the IMSI information, and transmits the subscriber identifier and the IMSI information to the mobile core network 5, and a termination unit 23 that transmits the IMSI information and the authentication information of the non-SIM terminal 3 to the mobile core network 5. The HSS 56 holds the subscriber identifier and the IMSI information in association with each other, and authenticates the IMSI information and the authentication information of the non-SIM terminal.

5 Claims, 7 Drawing Sheets

(56) References Cited

U.S. PATENT DOCUMENTS

| | | | |
|---|---|---|---|
| 11,445,435 B2* | 9/2022 | Di Girolamo | H04W 4/50 |
| 2015/0172315 A1* | 6/2015 | Hirst | H04L 63/0861 |
| | | | 726/5 |
| 2016/0261596 A1* | 9/2016 | Khello | H04W 12/08 |
| 2017/0280324 A1* | 9/2017 | Beals | H04W 12/08 |
| 2018/0302394 A1* | 10/2018 | Hirst | H04L 63/08 |
| 2019/0069162 A1* | 2/2019 | Lindheimer | H04W 12/08 |
| 2019/0253407 A1* | 8/2019 | Livanos | H04W 12/04 |
| 2019/0313216 A1* | 10/2019 | Wong | H04W 4/70 |
| 2020/0004982 A1* | 1/2020 | Mumford | H04L 9/0844 |
| 2020/0045541 A1* | 2/2020 | Kreishan | H04W 12/06 |
| 2021/0029629 A1* | 1/2021 | Wong | H04W 76/10 |
| 2021/0258787 A1* | 8/2021 | Bernsen | H04L 9/3073 |

* cited by examiner

Fig. 1

| SUBSCRIBER IDENTIFIER | IMSI INFORMATION |
|---|---|
| AAA | 42901XXXXXXXX |
| BBB | 42901YYYYYYYY |
| ... | ... |

11 SUBSCRIBER DATA

| ACCOMMODATION POSITION | SUBSCRIBER IDENTIFIER | IMSI INFORMATION | AUTHENTICATION INFORMATION |
|---|---|---|---|
| 001 | AAA | 42901XXXXXXXX | AUTHENTICATION KEY A |
| 002 | BBB | 42901YYYYYYYY | AUTHENTICATION KEY A |
| ... | ... | ... | ... |

Fig. 4

12 ALLOCATION DATA

| ACCOMMODATION POSITION | IMSI INFORMATION | IP ADDRESS OF HGW | IP ADDRESS OF TERMINATION UNIT |
|---|---|---|---|
| 001 | 42901XXXXXXXX | ... | ... |
| ... | ... | ... | ... |

COMMUNICATION METHOD, COMMUNICATION SYSTEM, RELAY DEVICE, AND RELAY PROGRAM

CROSS-REFERENCE TO RELATED APPLICATIONS

This application is a National Stage application under 35 U.S.C. § 371 of International Application No. PCT/JP2020/005214, having an International Filing Date of Feb. 12, 2020, which claims priority to Japanese Application Serial No. 2019-032841, filed on Feb. 26, 2019. The disclosure of the prior application is considered part of the disclosure of this application, and is incorporated in its entirety into this application.

TECHNICAL FIELD

The present disclosure relates to a communication method, a communication system, a relay device, and a relay program which are used in a communication system including a terminal not equipped with a subscriber identity module (SIM) and a relay device included in a fixed core network and relaying connection between a mobile core network and the terminal.

BACKGROUND ART

In recent years, with development of a communication network in the mobile core network, such as standardization of a 5th generation mobile communication system, Internet of Things (IoT), which is expected to connect various objects to the communication network to exchange information is seeing wide expansion.

Moreover, in the mobile core network, a service can be received through secure authentication by a subscriber identity module (SIM) equipped in a mobile terminal. On the other hand, a terminal connecting from the fixed core network may not equipped with a SIM, and a secure service to be provided in the mobile core network cannot thus be received, which is problematic.

In order to solve the problem, a method of authenticating the terminal not equipped with the SIM by the mobile core network is provided (for example, see Patent Literature 1). Patent Literature 1 proposes a method of using authentication information of the terminal equipped with the SIM under an access point where the terminal not equipped with the SIM is connected, as authentication information, when the terminal not equipped with the SIM is authenticated in the mobile core network.

CITATION LIST

Patent Literature

[Patent Literature 1] JP 5931802 B

SUMMARY OF THE INVENTION

Technical Problem

However, the method of Patent Literature 1 cannot be used when the terminal equipped with the SIM does not exist under the access point where the terminal not equipped with the SIM is connected.

An object of the present disclosure is to provide a communication method, a communication system, a relay device, and a relay program capable of appropriately authenticating a terminal not equipped with the SIM by a mobile core network.

Means for Solving the Problem

In order to solve the above-described problems, a first aspect of the present disclosure relates to a communication method that is used in a communication system including a terminal not equipped with a SIM, and a relay device included in a fixed core network and configured to relay connection between a mobile core network and the terminal. The communication method according to the first aspect of the present disclosure includes issuing, by the relay device, IMSI information corresponding to a subscriber identifier of the terminal and authentication information corresponding to the IMSI information to transmit the subscriber identifier and the IMSI information to the mobile core network, holding, by an authentication device included in the mobile core network, the subscriber identifier and the IMSI information in association with each other, transmitting, by the relay device, the IMSI information of the terminal and the authentication information of the terminal to the mobile core network, and authenticating, by the authentication device, the IMSI information of the terminal and the authentication information of the terminal.

The communication method may further include connecting, by the relay device, to the terminal, and connecting, by the relay device, to the mobile core network after the authentication device authenticates the IMSI information of the terminal and the authentication information of the terminal.

A second aspect of the present disclosure relates to a communication system including a terminal not equipped with a SIM, and a relay device included in a fixed core network and configured to relay connection between a mobile core network and the terminal. In the communication system according to the second aspect of the present disclosure, the relay device includes an issuing unit configured to issue IMSI information corresponding to a subscriber identifier of the terminal and authentication information corresponding to the IMSI information to transmit the subscriber identifier and the IMSI information to the mobile core network, and a termination unit configured to transmit the IMSI information of the terminal and the authentication information of the terminal to the mobile core network, and an authentication device included in the mobile core network holds the subscriber identifier and the IMSI information in associated with each other, and authenticates the IMSI information of the terminal and the authentication information of the terminal.

A third aspect of the present disclosure relates to a relay device configured to be used in a communication system including a terminal not equipped with a SIM, and a relay device included in a fixed core network and configured to relay connection between a mobile core network and the terminal. The relay device according to the third aspect of the present disclosure includes an issuing unit configured to issue IMSI information corresponding to a subscriber identifier of the terminal and authentication information corresponding to the IMSI information to transmit the subscriber identifier and the IMSI information to the mobile core network, and a termination unit configured to transmit the IMSI information of the terminal and the authentication information of the terminal to the mobile core network and connect to the mobile core network through SIM authentication by the mobile core network.

The relay device may further include a relay control unit configured to return an IP address of the termination unit to connect the termination unit and the terminal in response to a connection request from the terminal.

A fourth aspect of the present disclosure relates to a relay program for causing a computer to operate as the relay device according to the third aspect of the present disclosure.

Effects of the Invention

According to the present disclosure, it is possible to provide the communication method, the communication system, the relay device, and the relay program capable of appropriately authenticating the terminal not equipped with the SIM by the mobile core network.

DESCRIPTION OF EMBODIMENTS

Next, an embodiment of the present disclosure will be described with reference to the drawings. In description of the drawings below, the same or similar components are designated by the same or similar reference signs.

Communication System

Figure 1:
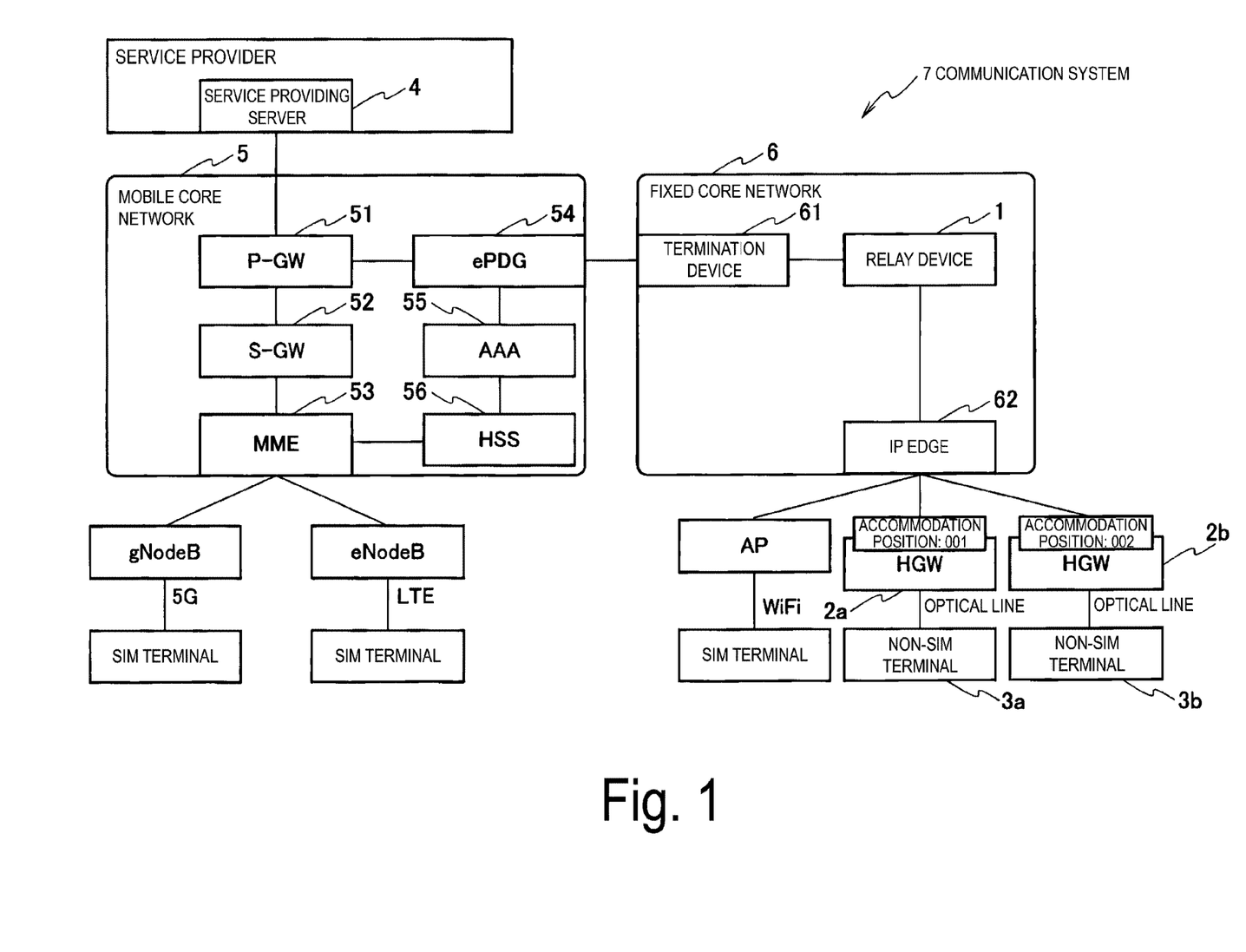
FIG. 1 is a diagram illustrating a configuration of a communication system according to an embodiment of the present disclosure.

A communication system 7 in which a relay device 1 according to an embodiment of the present disclosure is used will be described with reference to FIG. 1. The communication system 7 includes a service providing server 4, a mobile core network 5 connected to the service providing server 4, and a fixed core network 6 connected to the mobile core network 5. Also, the fixed core network 6 is connected with a first non-SIM terminal 3a via a first home gateway (HGW) 2a and a second non-SIM terminal 3b via a second HGW 2b.

In the embodiment of the present disclosure, the first HGW 2a and the second HGW 2b may be simply referred to as HGW 2 unless otherwise specifically distinguished. In addition, the first non-SIM terminal 3a and the second non-SIM terminal 3b may be simply referred to as non-SIM terminal 3 unless otherwise specifically distinguished. In the embodiment of the present disclosure, two pairs of the HGW 2 and the non-SIM terminal 3 is provided, but the number of pairs of the HGW 2 and the non-SIM terminal 3 is not limited to the above embodiment.

In the communication system 7 according to the embodiment of the present disclosure, the non-SIM terminal 3 is connected to the mobile core network 5 through SIM authentication by the mobile core network 5, and then a service can be received from the service providing server 4.

The HGW 2 is an interface for connecting the non-SIM terminal 3 to the fixed core network 6. For example, the HGW 2 is provided in a subscriber's home. The HGW 2 may be customer premises equipment (CPE), in addition to a so-called home gateway device.

The non-SIM terminal 3, which is a terminal used by a subscriber, is a computer terminal not equipped with the SIM. Examples of the non-SIM terminal 3 include a personal computer, a tablet, and the like, and the non-SIM terminal 3 is connected to the fixed core network 6 by being connected to HGW 2 by wire or wireless.

The service providing server 4 provides a service using the SIM authentication by the mobile core network 5. The service providing server 4 provides the service through the SIM authentication, and thus a secure service may be provided to a terminal on which the SIM authentication has been performed.

The mobile core network 5 is, for example, a 5th generation mobile communication system, and wirelessly connects to a user's terminal. The mobile core network 5 includes a packet data network-gateway (P-GW) 51, a serving-gateway (S-GW) 52, a mobility management entity (MME) 53, an enhanced packet data gateway (ePDG) 54, an authentication authorization accounting (AAA) 55, and a home subscriber server (HSS) 56, but may include other devices.

The P-GW 51 is an interface for connecting the mobile core network 5 to the service providing server 4. The S-GW 52 handles U plane data which is packet data of user data. The MME 53 handles C plane data for network control. In the embodiment of the present disclosure, the AAA 55 is an interface for connecting the fixed core network 6 to the HSS 56.

The HSS 56 is an authentication device in the mobile core network 5. The HSS authenticates, for the terminal accessing the mobile core network 5, a subscriber by using international mobile subscriber identity (IMSI) information and authentication information to permit connection to the mobile core network 5.

Figure 2:
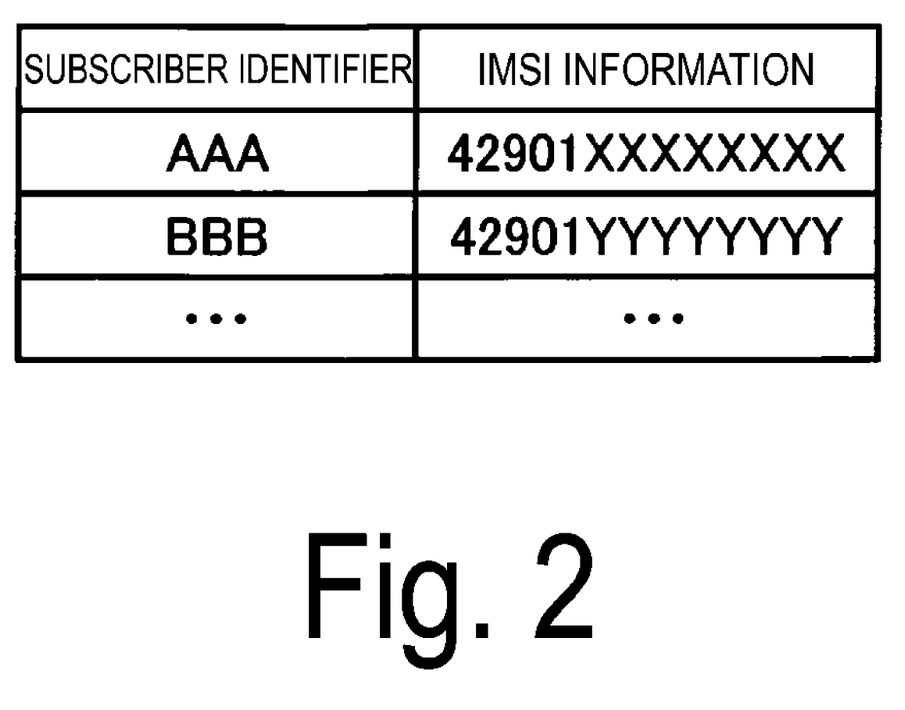
FIG. 2 is a diagram illustrating an example of data held by a home subscriber server (HSS) according to the embodiment of the present disclosure.

In the embodiment of the present disclosure, when a subscriber identifier of the non-SIM terminal 3 and the IMSI information of the non-SIM terminal 3 are transmitted from the relay device 1, as illustrated in FIG. 2, the HSS 56 holds the subscriber identifier and the IMSI information in associated with each other. The subscriber identifier registered here is a subscriber of a terminal not having the SIM, and is an identifier of a subscriber who is authorized to connect the terminal to the mobile core network 5 via the fixed core network 6. With reference to the IMSI information registered in advance, the HSS 56 authenticates a connection request for the non-SIM terminal 3.

When connecting the non-SIM terminal 3 to the mobile core network 5, the relay device 1 transmits, to the mobile core network 5, the IMSI information of the non-SIM terminal 3 and the authentication information of the non-SIM terminal 3, and HSS 56 authenticates the IMSI information of the non-SIM terminal 3 and the authentication information of the non-SIM terminal 3. The non-SIM terminal 3 and the relay device 1 are connected, and after the HSS 56 authenticates the IMSI information of the non-SIM terminal 3 and the authentication information of the non- SIM terminal 3, the relay device 1 is connected to the mobile core network 5. In other words, by the authentication of the HSS 56, the non-SIM terminal 3 and the P-GW 51 of the mobile core network 5 can be connected via the relay device 1.

The fixed core network 6 is connected to the user's terminal by wire. The fixed core network 6 includes the relay device 1, a termination device 61, and an IP edge 62.

In the embodiment of the present disclosure, the relay device 1 relays connection for the non-SIM terminal 3 to connect to the service providing server 4. The termination device 61 is an interface with the mobile core network 5 in the fixed core network 6. The IP edge is an interface with a subscriber side.

Relay Device

The relay device 1 according to the embodiment of the present disclosure will be described with reference to FIG. 3. The relay device 1 includes a storage device 10, a processing device 20, and a communication control device 30. The relay device 1 may be a single computer including the storage device 10, the processing device 20, and the communication control device 30, or may be a virtual computer formed by a plurality of hardware. Functions illustrated in FIG. 2 are implemented by a relay program executed by the computer.

The storage device 10 is a read only memory (ROM), a random access memory (RAM), a hard disk, and the like and stores various kinds of data such as input data, output data, and intermediate data for the processing device 20 executing processing. The processing device 20 is a central processing unit (CPU) and executes processing of the relay device 1 by reading and writing data stored in the storage device 10 or inputting and outputting data to and from the communication control device 30. The communication control device 30 is an interface for communicably connecting, by the relay device 1, the termination device 61 and the IP edge 62.

The storage device 10 stores the relay program, subscriber data 11, and allocation data 12.

Figure 4:
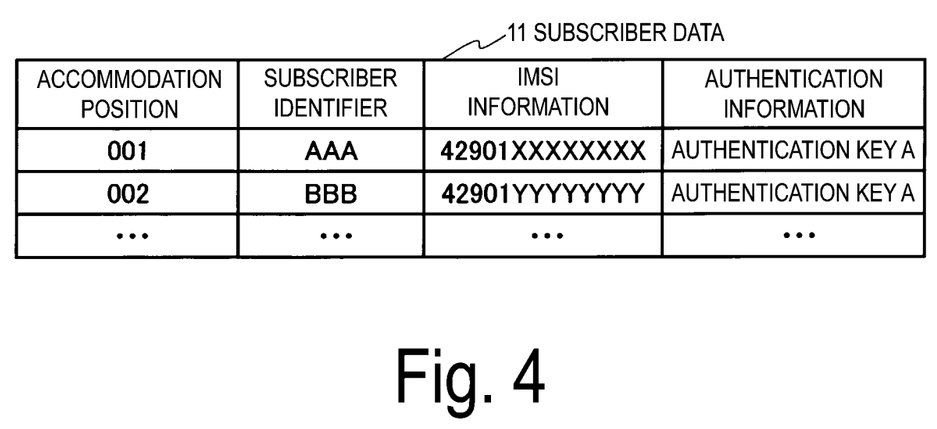
FIG. 4 is a diagram illustrating a data structure of the subscriber data and an example of data of the subscriber data.

The subscriber data 11 includes data referenced when a subscriber, who applied for the connection to the mobile core network 5, connects to the mobile core network 5 among subscribers who utilize the fixed core network 6. As illustrated in FIG. 4, the subscriber data 11 is data with which an accommodation position, the subscriber identifier, the IMSI information, and the authentication information for each of the non-SIM terminals 3 connected to the fixed core network 6 are associated.

Figure 5:
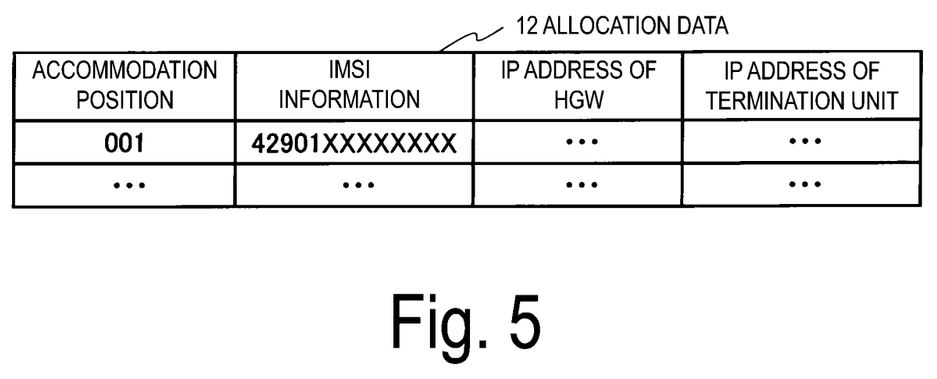
FIG. 5 is a diagram illustrating a data structure of the allocation data and an example of data of the allocation data.

As illustrated in FIG. 5, the allocation data 12 associates an IP address assigned to the HGW 2 to which a non-SIM terminal 3 connects and which connects to the mobile core network 5 via the fixed core network 6 with an IP address of a termination unit 23 responsible, in the relay device 1, for relaying the non-SIM terminal 3. With the allocation data 12, the relay device 1 identifies the IP address of the termination unit 23 that relays the communication of the non-SIM terminal 3 and the IP address of the HGW 2 which is a relay destination.

The processing device 20 includes an issuing unit 21, a relay control unit 22, and the termination unit 23.

The issuing unit 21 issues IMSI information corresponding to the subscriber identifier of the non-SIM terminal 3 and authentication information corresponding to the IMSI information to transmit the subscriber identifier and the IMSI information to the mobile core network 5. The subscriber identifier and IMSI information transmitted to the mobile core network 5 are held by the HSS 56 and are used for authentication when the non-SIM terminal 3 connects to the mobile core network 5.

Figure 6:
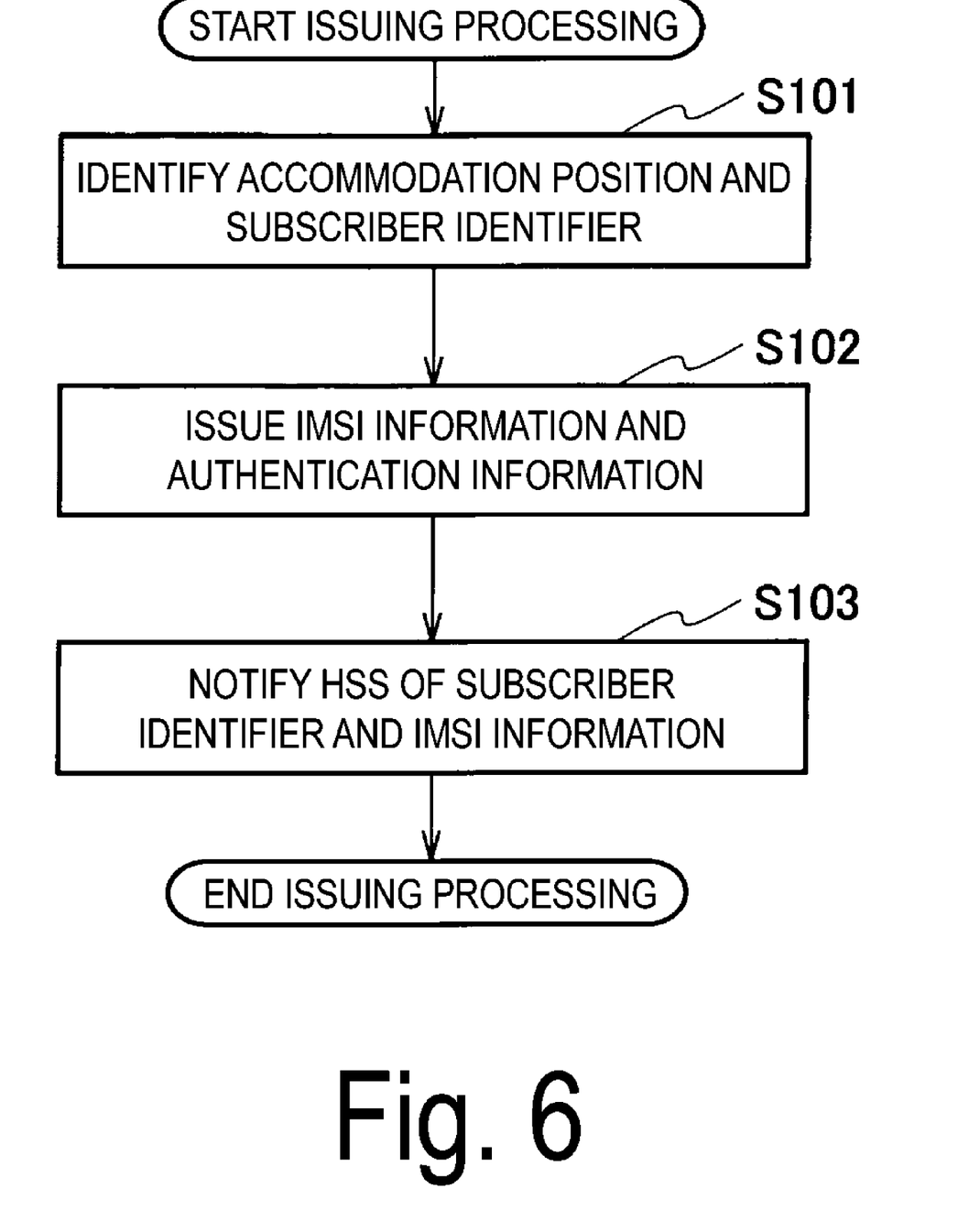
FIG. 6 is a flowchart illustrating issuing processing by an issuing unit of the relay device.

Issuing processing by the issuing unit 21 will be described with reference to FIG. 6. The issuing unit 21 issues the IMSI information and the authentication information to, for example, a subscriber who applied for a service of connecting to the mobile core network 5 via the fixed core network 6 and is authorized to receive the service.

In step S101, the issuing unit 21 identifies the accommodation position and subscriber identifier for the subscriber who receives the service of connecting to the mobile core network 5 via the fixed core network 6. Here, it is assumed that a subscriber with the accommodation position "001" and the subscriber identifier "AAA" has applied for this service.

In step S102, the issuing unit 21 issues the IMSI information and the authentication information for the subscriber identified in step S101. The IMSI information and the authentication information issued here are referenced upon authentication by the HSS 56.

In step S103, the issuing unit 21 notifies the HSS 56 of the subscriber identifier identified in step S101 and the IMSI information issued in step S102.

This allows the HSS 56 to authenticate the subscriber with the subscriber identifier "AAA" based on the IMSI information and the authentication information issued in step S102.

The relay control unit 22 controls relaying the connection between the relay device 1 and the non-SIM terminal 3 and the connection between the relay device 1 and the mobile core network 5. The relay control unit 22 returns the IP address of the termination unit 23 to connect the termination unit 23 and the non-SIM terminal 3 in response to the connection request from the non-SIM terminal 3. Specifically, the relay control unit 22 returns, regarding the non-SIM terminal 3, the IP address of the termination unit 23 that relays the communication of the non-SIM terminal 3 in response to RADIUS Access Request from the IP edge 62, so that it is possible to communicate between the IP edge 62 and the termination unit 23. Further, since the communication can be made between the non-SIM terminal 3 and the IP edge 62, it is possible to communicate between the non-SIM terminal 3 and the termination unit 23.

The termination unit 23 connects with the non-SIM terminal 3 and the mobile core network 5 to relay communication between the non-SIM terminal 3 and the termination unit 23 and the communication between the mobile core network 5 and the termination unit 23, so that communication between the non-SIM terminal 3 and the mobile core network 5 is achieved. When connecting the non-SIM terminal 3 and the mobile core network 5, the termination unit 23 transmits the IMSI information of the non-SIM terminal 3 and the authentication information of the non-SIM terminal 3 to the mobile core network 5. Through the SIM authentication by the mobile core network 5, the termination unit 23 connects with the mobile core network 5.

Relay device 1 may include a plurality of termination units 23 so that it can relay to the plurality of non-SIM terminals 3. In that case, different IP addresses are assigned to each of the plurality of termination units 23.

Communication Method

Figure 7:
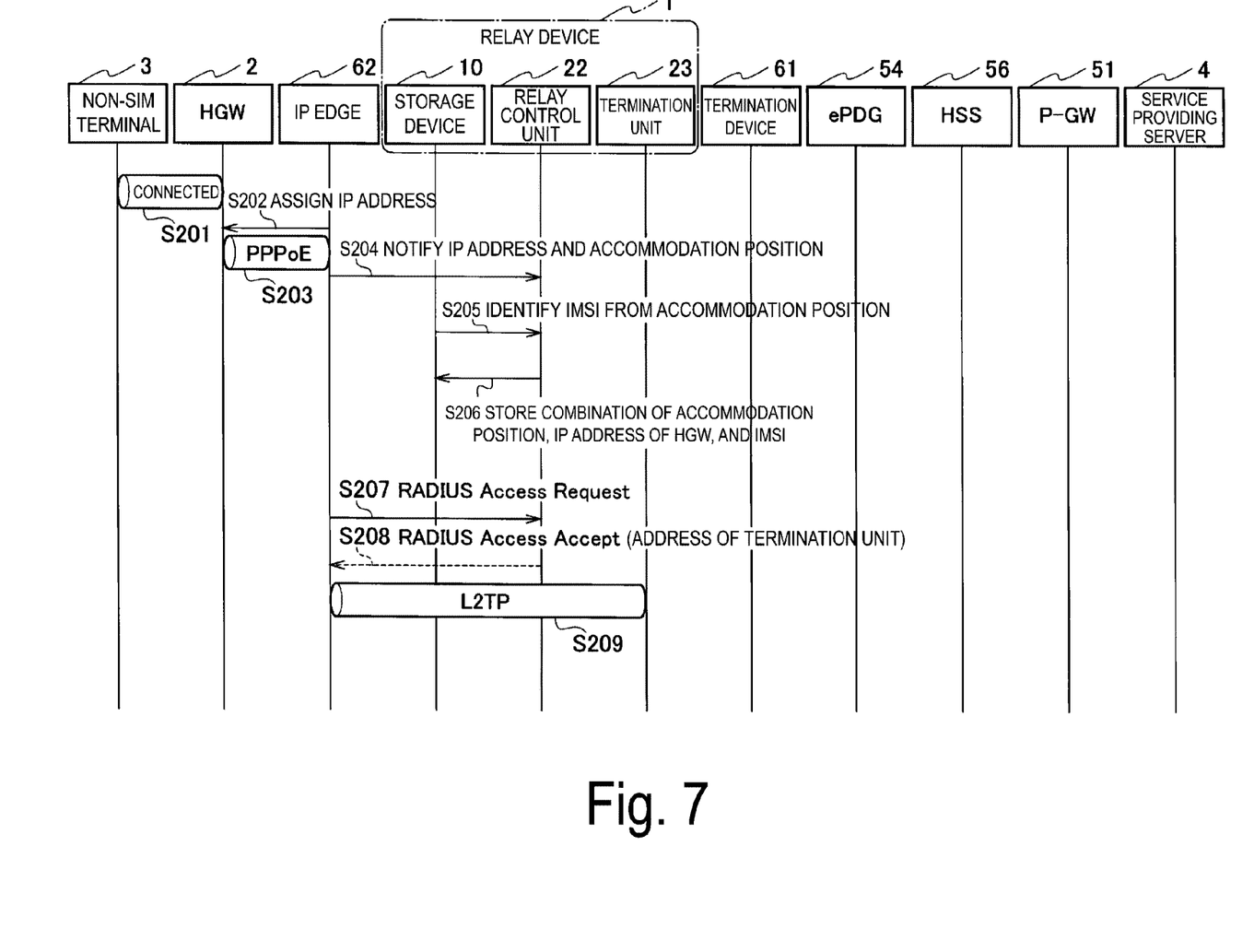
FIG. 7 is a sequence diagram (first part) illustrating a communication method according to the embodiment of the present disclosure.
Figure 8:
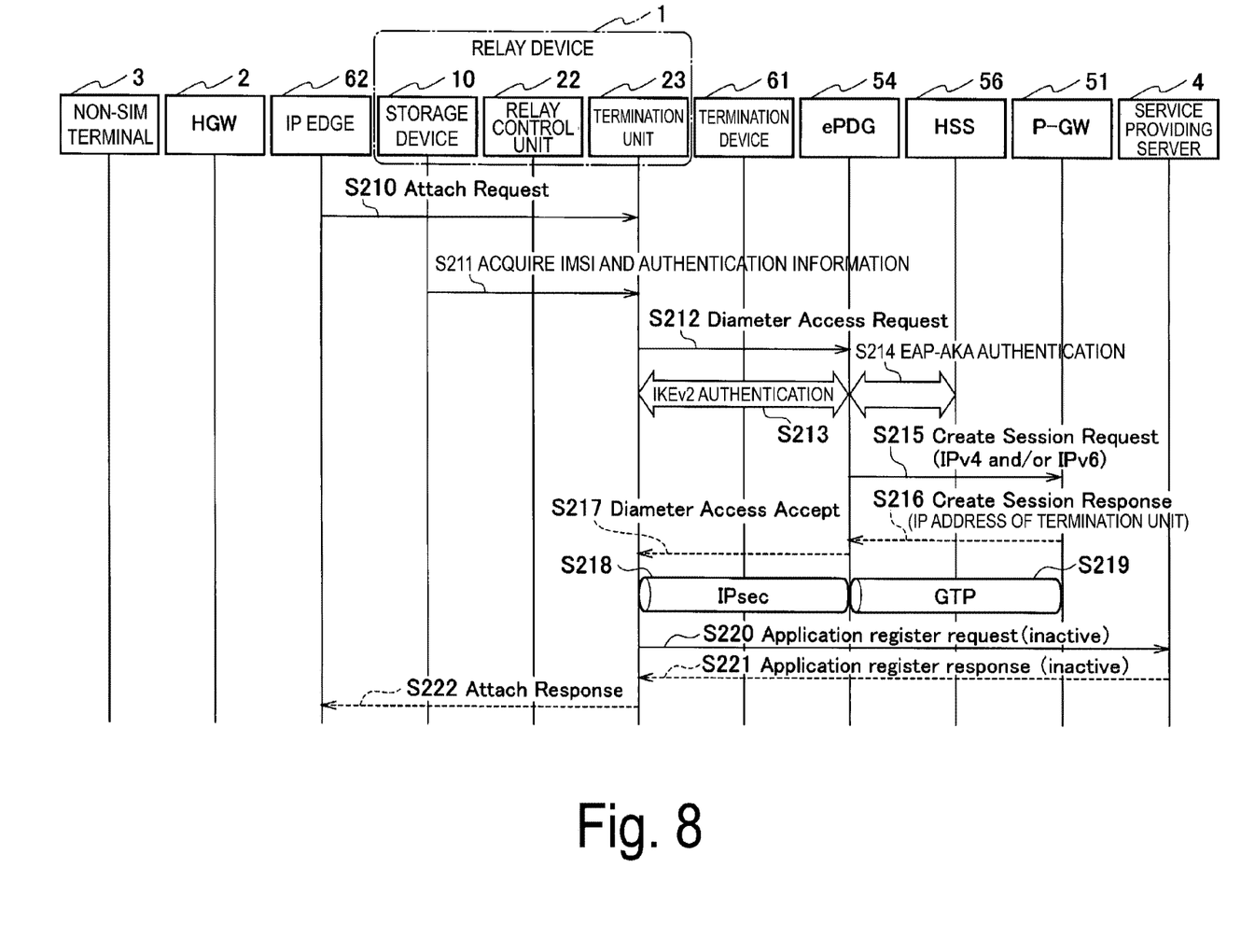
FIG. 8 is a sequence diagram (second part) illustrating a communication method according to the embodiment of the present disclosure.

A communication method according to the embodiment of the present disclosure will be described with reference to FIGS. 7 and 8. In the communication method illustrated in FIGS. 7 and 8, processing of connecting the non-SIM terminal 3 to the service providing server 4 via the fixed core network 6 and the mobile core network 5 will be described.

First, in step S201, connection is made between the non-SIM terminals 3 and HGW 2. Any protocol is used for this connection.

In step S202, the IP edge 62 assigns an IP address to the HGW 2. In step S203, point-to-point protocol over Ethernet (PPPoE) connection is established between the HGW 2 and the IP edge 62. In step S204, the IP edge 62 notifies the relay control unit 22 of the relay device 1 of the IP address assigned to the HGW 2 accommodating the non-SIM terminal 3 and the accommodation position of the HGW 2.

In step S205, the relay control unit 22 identifies, from the storage device 10, IMSI information of the non-SIM terminal 3 corresponding to the accommodation position notified in step S204. In step S206, the relay control unit 22 sets, to the allocation data 12 of the storage device 10, data with which the accommodation position and the IP address of the HGW 2 notified in step S204 and the IMSI information identified in step S205 are associated.

When the IP edge 62 transmits the RADIUS Access Request to the relay control unit 22 in step S207, the relay control unit 22 returns RADIUS Access Accept to the IP edge 62 in step S208. Here, the relay control unit 22 includes, in the RADIUS Access Accept, an IP address of the termination unit 23 responsible for relaying communication of the non-SIM terminal 3.

In step S209, a tunnel of layer 2 tunneling protocol (L2TP) is established between the IP edge 62 and the termination unit 23. As a result, the non-SIM terminal 3 and the termination unit 23 are connected through the connection established in step S201, the connection established in step S203, and the connection established in step S209.

In step S210, the IP edge 62 transmits Attach Request to the termination unit 23. In step S211, the termination unit 23 acquires the IMSI information of the non-SIM terminal 3 and the authentication information of the non-SIM terminal 3 from the subscriber data 11 of the storage device 10.

In step S212, the termination unit 23 transmits Diameter Access Request to ePDG 54. The Diameter Access Request includes the IMSI information of the non-SIM terminal 3 and the authentication information of the non-SIM terminal 3 which are identified in step S211. In step S213, an Internet key exchange protocol version 2 (IKEv2) authentication is performed between the termination unit 23 and the ePDG 54. In step S214, extensible authentication protocol-authentication and key agreement (EAP-AKA) authentication is performed between ePDG 54 and HSS 56.

In step S215, the HSS 56 transmits Create Session Request to the P-GW 51, and in the step S216, the HSS 56 receives Create Session Response from the P-GW 51. The Create Session Response includes an IP address assigned to the termination unit 23 in communication between the termination unit 23 and the P-GW 51. In step S217, the ePDG 54 transmits Diameter Access Accept to the termination unit 23. The Diameter Access Accept includes an IP address of the termination unit 23 assigned by the P-GW 51.

In step S218, the termination unit 23 and the ePDG 54 are connected by a security architecture for Internet protocol (IPsec). In step S219, the ePDG 54 and the P-GW 51 are connected by general packet radio service (GPRS) tunneling protocol (GTP). As a result, the termination unit 23 and the P-GW 51 are connected through the connection established in step S218 and the connection established in step S219. Further, since the connection is made between the non-SIM terminal 3 and the termination unit 23, connection is also made between the non-SIM terminal 3 and the P-GW 51.

In step S220, when the termination unit 23 transmits Application register request to the service providing server 4, the service providing server 4 transmits Application register response to the termination unit 23 in step S221. In step S222, the termination unit 23 transmits Attach Response to the IP edge 62. As a result, the non-SIM terminal 3 is connected to the service providing server 4 via the fixed core network 6 and the mobile core network 5.

In this way, the communication system 7 according to the embodiment of the present disclosure provides the relay device 1 in the fixed core network 6. The relay device 1 issues IMSI information and authentication information required for the non-SIM terminal 3 to receive the SIM authentication, and transmits, to the HSS 56, the subscriber identifier of the non-SIM terminal 3 and IMSI information of the non-SIM terminal 3. This enables the non-SIM terminal 3 to receive the SIM authentication by the HSS 56.

The relay device 1 provides the termination unit 23 that terminates and relays the communication between the non-SIM terminal 3 and the service providing server 4, so that it is possible to communicate between the non-SIM terminal 3 and the service providing server 4 via the termination unit 23.

According to such a communication system 7, the mobile core network 5 can properly authenticate the non-SIM terminal 3 even when the terminal equipped with the SIM does not exist under the access point to which the non-SIM terminal 3 connects.

In addition, the service providing server 4 that provides the current IoT service often provides a service only to the terminals accommodated by the mobile core network 5 provided by a particular telecommunications carriers. Thus, with the communication system 7 according to the embodiment of the present disclosure, the service can be provided to the user regardless of whether the terminal is accommodated by the mobile core network 5. For example, data necessary for mobility is accumulated in the service providing server 4 via the mobile core network 5 from a terminal equipped with the SIM. On the other hand, broadband data unnecessary for mobility can be accumulated in the service providing server 4 via the fixed core network 6 from a terminal not equipped with the SIM. Thus, the service providing server 4 in the communication system 7 can provide a flexible and efficient service.

Other Embodiments

Although the embodiment of the present disclosure has been described above, it should not be understood that description and drawings that are parts of the disclosure are intended to limit the present disclosure. Various alternative embodiments, examples, and running techniques will become apparent from the disclosure for those skilled in the art.

Figure 3:
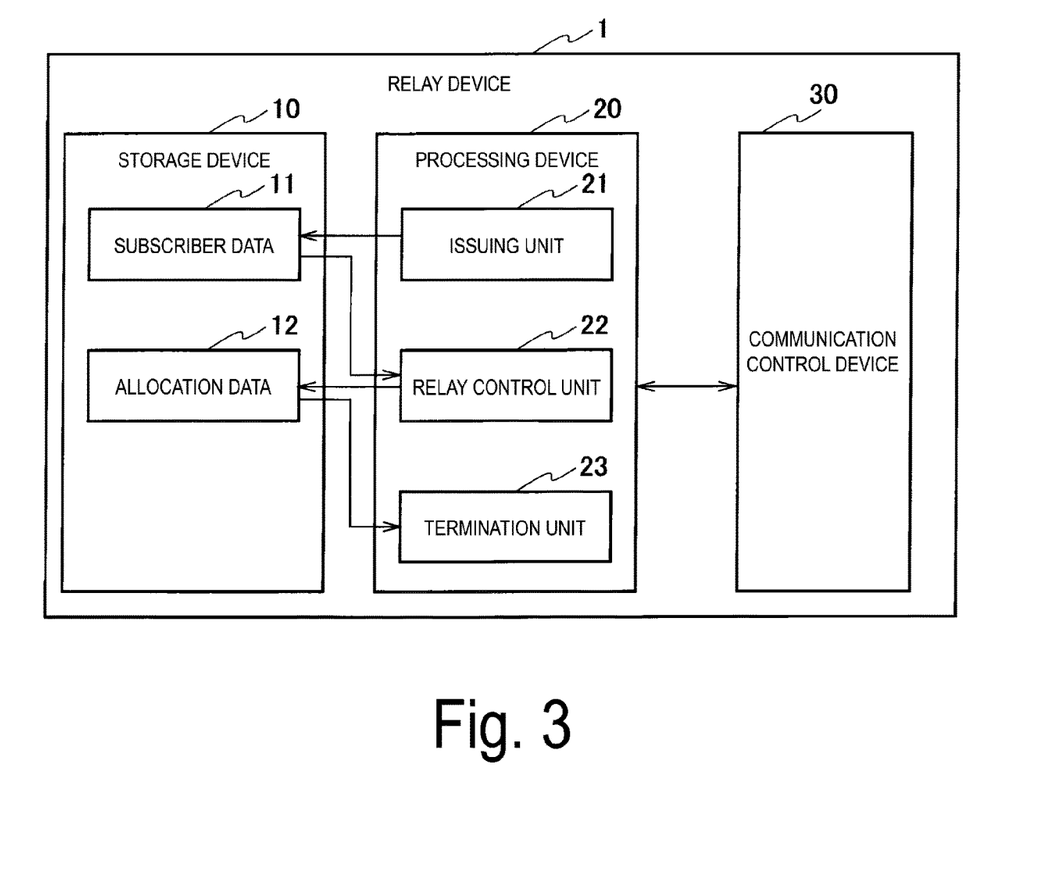
FIG. 3 is a diagram illustrating a hardware configuration and a functional block of a relay device according to the embodiment of the present disclosure.

For example, the relay device described in the embodiment of the present disclosure may be configured on a single piece of hardware as illustrated in FIG. 3 or may be configured on a plurality of pieces of hardware in accordance with functions and the number of processing operations of the relay device. Also, the relay device may be implemented on an existing communication device.

It is a matter of course that various embodiments and the like that are not described herein are also included in the present disclosure. Therefore, the technical scope of the present disclosure is defined merely by specific matters of the present disclosure related to the scope of aspects that is reasonable from the above description.

REFERENCE SIGNS LIST

1 Relay device
2 HGW
3 Non-SIM terminal
4 Service providing server
5 Mobile core network
6 Fixed core network
7 Communication system
10 Storage device
11 Subscriber data
12 Allocation data
20 Processing device
21 Issuing unit
22 Relay control unit
23 Termination unit
51 P-GW
52 S-GW
53 MME
54 ePDG
55 AAA
56 HSS
61 Termination device
62 IP edge

The invention claimed is:

1. A communication method that is used in a communication system including a terminal not equipped with a subscriber identity module (SIM), and a relay device included in a fixed core network and configured to relay connection between a mobile core network and the terminal, the method comprising:
receiving, by the relay device, an accommodation position of a gateway that accommodates the terminal;
identifying, by the relay device referring to subscriber data, international mobile subscriber identity (IMSI) information of the terminal based on the accommodation position of the gateway, wherein the subscriber data comprises, for each of one or more subscribers, a respective data entry associating a respective subscriber identifier with a respective accommodation position, the respective IMSI information, and respective authentication information for the respective subscriber;
identifying, by the relay device referring to the subscriber data, the authentication information of the terminal;
holding, by an authentication device included in the mobile core network, the subscriber identifier and the IMSI information in association with each other;
transmitting, by the relay device, the IMSI information of the terminal and the authentication information of the terminal to the mobile core network; and
authenticating, by the authentication device, the IMSI information of the terminal and the authentication information of the terminal.

2. The communication method according to claim 1, further comprising:
connecting, by the relay device, to the terminal; and
connecting, by the relay device, to the mobile core network after the authentication device authenticates the IMSI information of the terminal and the authentication information of the terminal.

3. A communication system, comprising:
a terminal not equipped with a subscriber identity module (SIM); and
a relay device included in a fixed core network and configured to relay connection between a mobile core network and the terminal;
wherein the relay device includes a storage device storing instructions and a processor configured to execute the instructions to perform:
receiving an accommodation position of a gateway that accommodates the terminal;
identifying, by referring to subscriber data, international mobile subscriber identity (IMSI) information of the terminal based on the accommodation position of the gateway, wherein the subscriber data stores, for each of one or more subscribers, a respective data entry associating a respective subscriber identifier with a respective accommodation position, the respective IMSI information, and respective authentication information for the respective subscriber;
identifying, by referring to the subscriber data, the authentication information of the terminal; and
transmitting the IMSI information of the terminal and the authentication information of the terminal to the mobile core network; and
an authentication device included in the mobile core network holds the subscriber identifier and the IMSI information in associated with each other, and authenticates the IMSI information of the terminal and the authentication information of the terminal.

4. A relay device configured to be used in a communication system including a terminal not equipped with a subscriber identity module (SIM), and a relay device included in a fixed core network and configured to relay connection between a mobile core network and the terminal, the relay device comprising:
a storage device storing instructions and a processor configured to execute the instructions to perform operations comprising:
receiving an accommodation position of a gateway that accommodates the terminal;
identifying, by referring to subscriber data, international mobile subscriber identity (IMSI) information of the terminal based on the accommodation position of the gateway, wherein the subscriber data stores, for each of one or more subscribers, a respective data entry associating a respective subscriber identifier with a respective accommodation position, the respective IMSI information, and respective authentication information for the respective subscriber;
identifying, by referring to the subscriber data, the authentication information of the terminal; and
transmitting the IMSI information of the terminal and the authentication information of the terminal to the mobile core network.

5. The relay device according to claim 4, wherein the operations further comprise:
returning an internet protocol (IP) address of a termination unit to connect the termination unit and the terminal in response to a connection request from the terminal.

* * * * *